United States Patent Office 3,772,295
Patented Nov. 13, 1973

3,772,295
QUINAZOLINE DERIVATIVES
Max Fernand Robba, Paris, René Henri Pierre Marcy, Espins, Calvados, and Denise Jeanne Claude Duval, Sartrouville, Yvelines, France, assignors to Innothera, Val de Marne, France
No Drawing. Filed Feb. 16, 1971, Ser. No. 115,797
Claims priority, application France, Feb. 16, 1970, 7005371
Int. Cl. C07d 99/02
U.S. Cl. 260—256.5 R    2 Claims

ABSTRACT OF THE DISCLOSURE

Quinazoline derivatives which contain an amino residue in 4-position and optionally other substituents are of value as diuretics. Their production and use is described.

---

The present invention relates to quinazoline derivatives which may be used therapeutically as diuretics.

These derivatives correspond to the formula

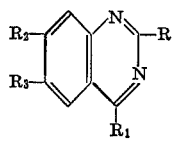

wherein $R_1$ represents an amino group derived from one of the following primary or secondary amines: β-methoxy-ethylamine, β-ethoxy-ethylamine, γ-methoxypropyl-amine, γ-ethoxy-propylamine, cyclopentyl-amine, hexamethylene-imine, trifluoromethyl-aniline, furfurylamine, (furyl-3 methyl)-amine, tetrahydro-furfurylamine and tetrahydrofuryl-3 methylamine, R represents either a hydrogen atom or a phenyl group carrying one or several substituents such as a methyl or methoxy radical, a chlorine or fluorine atom, a methylenedioxy group, or a radical derived from furan, thiophene, pyridine, picoline, benzofuran or benzothiophene, or a naphthyl radical, and $R_2$ and $R_3$ each represent an atom of hydrogen or of chlorine.

The present invention also relates to the addition salts of these quinazoline derivatives with pharmaceutically acceptable organic or mineral acids.

According to the invention the above described derivatives are prepared by reacting a 4-quinazolone of the formula

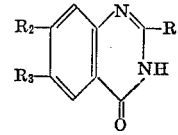

wherein R, $R_2$ and $R_3$ have the meanings given to them above, with phosphorus oxychloride, and reacting the product obtained with the primary or secondary amine from which the group $R_1$ is derived, and when desired, converting the quinazoline obtained to a pharmaceutically acceptable salt by reaction with an acid.

The following example will serve to illustrate the invention. Temperatures are in degree centigrade.

EXAMPLE 1

(a) 4-chloro-quinazoline 10 g. of 4-oxo-quinazolone, 100 cc. of phosphorus oxychloride and 10 g. of phosphorus pentachloride are mixed. The mixture is heated to reflux for 4 hours. The product is evaporated to dryness in vacuo hydrolysed with 200 to 300 g. of iced water. The precipitate is separated, washed with water, dried and recrystallised from isopropanol. Yield=72%. The product melts at 98°.

(b) 4-meta-trifluoromethylanilino-quinazoline

A solution of 5 g. of 4-chloroquinazoline and 5 cc. of meta-trifluoromethylaniline in 60 cc. of absolute ethanol is heated to reflux for 3 hours. The product is evaporated to dryness in vacuo and 50 cc. of water is added to the residue. After making alkaline by an aqueous normal solution of soda, it is extracted with chloroform. The solution is dried over sodium sulphate and the solvent evaporated.

(c) The residue obtained is dissolved in acetone and heated to reflux with 1.2 equivalents of oxalic acid. The 4-(m-trifluoromethyl-anilino)-quinazoline oxalate is recrystallized from acetonitrile. White crystals of which the melting point is 255° are obtained. Yield=45%.

Other addition salts of this compound with pharmaceutically acceptable organic or mineral acids are obtained in the same way as for the oxalate.

EXAMPLES 2–13

In the following table there are represented several compounds which are identified by the indication of the values of the symbols of Formula I and which can be prepared in the manner described above.

TABLE I

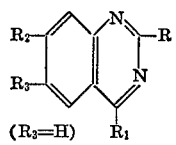

($R_3$=H)

| Compound Number | R | $R_1$ | $R_2$ | Melting point, deg. | Yield, percent | Solvent of crystallisation |
|---|---|---|---|---|---|---|
| 2 | H | $NH-CH_2-CH_2-OCH_3$ | H | 129 | 50 | Acetonitrile. |
| 3 | H | $NH-CH_2-CH_2-OC_2-H_5$ (acid maleate) | H | 124 | 45 | Ethanol (1) plus ethyl-ether (1). |
| 4 | H | $NH-CH_2-CH_2-CH_2-OCH_3$ (acid maleate) | H | 136 | 35 | Do. |
| 5 | H | $NH-CH_2-CH_2-CH_2-OC_2H_5$ (acid tartrate) | H | 85 | 40 | Ethanol (1) plus ethyl-ether (2). |

TABLE I—Continued

| Compound Number | R | R₁ | R₂ | Melting point, deg. | Yield, percent | Solvent of crystallisation |
|---|---|---|---|---|---|---|
| 6 | H |  NH—⬠ (acid oxalate) | H | 217 | 60 | Methanol. |
| 7 | H |  N⬡ (acid fumarate) | H | 133 | 60 | Ethanol. |
| 8 | H |  NH—CH₂—furyl | H | 170 | 60 | Do. |
| 9 | H |  NH—CH₂—furyl (acid maleate) | H | 120 | 50 | Do. |
| 10 |  thienyl | 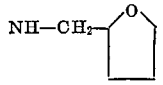 NH—CH₂—furyl | Cl | 130 | 40 | Cyclohexane. |
| 11 |  thienyl | 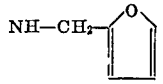 NH—CH₂—tetrahydrofuryl | Cl | 151 | 30 | Do. |
| 12 |  thienyl | 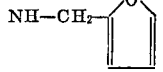 NH—CH₂—furyl | H | 163 | 50 | Do. |
| 13 |  thienyl |  NH—CH₂—tetrahydrofuryl | H | 110 | 45 | Do. |

The compounds of Examples 1–13 are named as follows:

4(β-methoxy ethyl amino)-quinazoline
4(β-ethoxy ethyl amino)-quinazoline
4(γ-methoxy propyl amino)-quinazoline
4(γ-ethoxy propyl amino)-quinazoline
4(cyclopentyl amino)-quinazoline
4(hexamethylene-imino)-quinazoline
4(meta-trifluoromethyl anilino)-quinazoline
4(furfurylamino)-quinazoline
4(tetrahydrofurfurylamino)-quinazoline
2-(α-thienyl)-4-furfurylamino quinazoline
2-(α-thienyl)-4-tetrahydrofurfurylamino quinazoline
2-(α-thienyl)-4-furfurylamino-7-chloro quinazoline
2-(α-thienyl)-4-tetrahydrofurfurylamino-7-chloro-quinazoline The new derivatives of the invention have been made the subject of a pharmacological study, showing their diuretic properties.

(I) Acute toxicity.—The acute toxicity of the quinazoline derivatives has been studied in the mouse, by the intraperitoneal route, for certain compounds chosen by way of example. These products have been administered in suspension in a dilute aqueous solution of carboxymethyl cellulose. Their toxicities are low. The various results obtained are assembled in Table II.

TABLE II.—DETERMINATION OF THE ACUTE TOXICITY IN THE MOUSE

[The quinazoline derivatives were injected intraperitoneally, using three animals for each dose]

| Compound number | Dose in mg./kg. | Concentration in g./100 ml. of suspension | Percentage mortality after 5 days |
|---|---|---|---|
| 2 | 30 | 0.3 | 0 |
|   | 100 | 3.0 | 0 |
|   | 300 | 3.0 | 100 |
| 3 | 30 | 1.0 | 0 |
|   | 50 | 1.0 | 0 |
|   | 100 | 1.0 | 100 |
| 4 | 30 | 0.3 | 0 |
|   | 100 | 1.0 | 0 |
| 6 | 50 | 1.0 | 0 |
|   | 100 | 1.0 | 66 |
|   | 300 | 3.0 | 100 |
| 1 | 300 | 3.0 | 0 |
|   | 600 | 3.0 | 66 |
|   | 900 | 3.0 | 100 |
| 8 | 300 | 3.0 | 0 |
|   | 600 | 3.0 | 100 |
| 10 | 300 | 3.0 | 0 |
|    | 600 | 3.0 | 66 |
| 12 | 300 | 3.0 | 0 |
|    | 600 | 3.0 | 33 |
|    | 900 | 3.0 | 100 |
| 13 | 300 | 3.0 | 0 |
|    | 600 | 3.0 | 33 |
|    | 900 | 3.0 | 66 |

(II) Diuretic activity.—In the rat deprived of food and drink for 20 hours, the administration of a substance possessing diuretic properties, previously to the ingestion of 25 ml. of an isotonic solution of sodium chloride per kg. of body weight, provokes a significant increase in the volume of urine excreted during the hours which follow the ingestion of the physiological serum.

Eight rats were used for each dose of the product studied, the animals being grouped in pairs in cages for metabolism testing.

The treated rats received, by the digestive route, the quinazoline derivatives (X) and the selected reference products (R), furosemide and acetazolamide, 30 minutes before the physiological serum, one lot of test rats receiving, for comparison, 5 ml./kg. of the isotonic solution of NaCl.

The products (R) or (X) were administered in the form of a suspension in a dilute aqueous solution of carboxymethyl cellulose, at a constant volume of 5 ml./kg.

The volume of urine recovered was measured 5 hours after the ingestion of 25 ml./kg. of physiological serum.

The average diuretic activity of the reference products (R) and of the quinazoline derivatives (X) is expressed by the ratios:

$$\frac{\text{volume of urine of the rats treated by R}}{\text{volume of urine of the control test rats T}}$$

and $$\frac{\text{volume of urine of the rats treated by X}}{\text{volume of urine of the control test rats T}}$$

For example, a substance having a diuretic activity expressed by the FIG. 2 provokes in the treated rats the emission of a volume of urine equal to twice that which is observed in the control rats.

The results obtained with certain derivatives, taken by way of example, are indicated in Table III and show that there is a clear increase in the diuresis.

TABLE III.—DIURETIC ACTIVITY IN THE RAT BY DIGESTIVE ROUTE

[The quinazoline derivatives, furosemide and acetazolamide comparatively studied in the same test were administered by the digestive route 30 minutes before the isotonic solution of sodium chloride]

| Reference product (R) | | | Quinazoline derivative (X) | | |
|---|---|---|---|---|---|
| Name | Dose in mg./kg. (oral route) | Diuretic activity: volume urine (R)/ volume urine (T) | Compound No. | Dose in mg./kg. (oral route) | Diuretic activity: volume urine (X)/ volume urine (T) |
| Furosemide | 40 | 5.6 | 3 | 100 | 4.0 |
| Do | 40 | 2.0 | 4 | 100 | 3.0 |
| Do | 40 | 2.0 | 6 | 100 | 2.4 |
| Do | 40 | 2.8 | 1 | 100 | 2.8 |
| Do | 40 | 3.1 | 8 | 100 | 2.3 |
| Do | 40 | 4.4 | 10 | 100 | 3.3 |
| Do | 40 | 4.4 | 11 | 100 | 2.2 |
| Do | 40 | 6.9 | 12 | 100 | 5.5 |
| Do | 40 | 6.4 | 13 | 100 | 2.7 |

The new compounds of the invention may be used in human therapy and in veterinary therapy as a result of their diuretic properties. This diuretic activity serves for the elimination of water and electrolytes with an effect essentially of natruresis and chloro-uresis, the potassium uresis being moderated.

In particular they may be administered in cases of hydrosodic retention which are produced in: decompensated cardiopathy with peripheral and visceral oedemas, oedemas of cardiac origin, oedemas of renal origin, oedemas and ascites of hepatic origin, acute oedema of the lungs, dyspnoea of cardiac insufficiency, acute asystolia, arterial hypertension, and heavy surcharge by hydrolipopexia.

The new derivatives may be presented for oral administration or parenteral administration in man or animals, particularly in association with excipients appropriate to these routes.

Thus, for example, they can be presented in the form of tablets, capsules, gelules and injectable solutions. The invention includes, as will be understood, pharmaceutical compositions which contain one or more of these new derivatives.

The daily dosage may, according to the case be from 20 to 800 mg.

An example of a pharmaceutical composition is the following:

|  | G. |
|---|---|
| 2-α-thienyl-4-furfurylamino-quinazoline | 0.100 |
| Lactose | 0.100 |
| Starch | 0.095 |
| Magnesium stearate | 0.005 | to make a tablet weighing 0.300 g.

We claim as our invention:

1. A quinazoline derivative having the formula

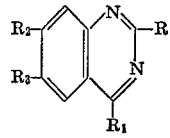

wherein
$R_1$ is a moiety selected from the group consisting of furfurylamino, furyl-3-methylamino, tetrahydrofurfurylamino, and tetrahydrofuryl-3-methylamino,
R is selected from the group consisting of thienyl and benzothienyl and
$R_2$ and $R_3$ each represent an atom selected from the class consisting of hydrogen and chlorine and acid addition salts thereof with pharmaceutically acceptable organic and mineral acids.

2. The quinazoline derivative of claim 1, which is 2-α-thienyl-4-furfurylamino-quinazoline.

References Cited

UNITED STATES PATENTS 3,635,979  1/1972  Hess _____ 260—256.5 R

OTHER REFERENCES

Burch: Chem. Abstracts, 64:19608c (1966).

RICHARD J. GALLAGHER, Primary Examiner

U.S. Cl. X.R.

260—251 QA, 256.4 Q; 424—251